US 010116933B2

(12) United States Patent
Hsiang

(10) Patent No.: US 10,116,933 B2
(45) Date of Patent: Oct. 30, 2018

(54) METHOD OF LOSSLESS MODE SIGNALING FOR VIDEO SYSTEM WITH LOSSLESS AND LOSSY CODING

(71) Applicant: MediaTek Inc., Hsin-Chu (TW)

(72) Inventor: Shih-Ta Hsiang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 272 days.

(21) Appl. No.: 14/916,480

(22) PCT Filed: Oct. 14, 2014

(86) PCT No.: PCT/CN2014/088563
§ 371 (c)(1),
(2) Date: Mar. 3, 2016

(87) PCT Pub. No.: WO2015/055111
PCT Pub. Date: Apr. 23, 2015

(65) Prior Publication Data
US 2016/0198154 A1 Jul. 7, 2016

Related U.S. Application Data

(60) Provisional application No. 61/890,360, filed on Oct. 14, 2013.

(51) Int. Cl.
*H04N 19/172* (2014.01)
*H04N 19/103* (2014.01)
(Continued)

(52) U.S. Cl.
CPC ........... *H04N 19/103* (2014.11); *H04N 19/12* (2014.11); *H04N 19/124* (2014.11);
(Continued)

(58) Field of Classification Search
CPC .................................................. H04N 19/103
See application file for complete search history.

(56) References Cited

U.S. PATENT DOCUMENTS 9,407,915 B2 * 8/2016 Gu ....................... H04N 19/139
9,521,410 B2 * 12/2016 Seregin ................. H04N 19/70
(Continued)

OTHER PUBLICATIONS

International Search Report dated Jan. 13, 2015, issued in application No. PCT/CN2014/088563.

*Primary Examiner* — Jayanti K Patel
*Assistant Examiner* — Irfan Habib
(74) *Attorney, Agent, or Firm* — McClure, Qualey & Rodack, LLP

(57) ABSTRACT

A method of efficient lossless mode syntax signaling for a coding system supporting both lossless and lossy coding is disclosed. In one embodiment, a first syntax element is incorporated in a picture level to indicate whether to use a forced lossless coding mode if lossless coding is allowed for the current picture. If the first syntax indicates that the forced lossless coding mode is selected, all coding units in the slices of the picture are coded using lossless coding. If the first syntax indicates that the forced lossless coding mode is not selected, each coding unit in a slice of the picture can be coded according to a second syntax element indicating whether each coding unit is coded using lossless coding or not. In another embodiment, the forced lossless mode can be applied to coding units on a slice by slice basis.

8 Claims, 4 Drawing Sheets

(51) Int. Cl.
  *H04N 19/70* (2014.01)
  *H04N 19/12* (2014.01)
  *H04N 19/157* (2014.01)
  *H04N 19/174* (2014.01)
  *H04N 19/124* (2014.01)
  *H04N 19/18* (2014.01)
  *H04N 19/44* (2014.01)
  *H04N 19/65* (2014.01)
  *H04N 19/91* (2014.01)

(52) U.S. Cl.
  CPC ......... *H04N 19/157* (2014.11); *H04N 19/172* (2014.11); *H04N 19/174* (2014.11); *H04N 19/18* (2014.11); *H04N 19/44* (2014.11); *H04N 19/65* (2014.11); *H04N 19/70* (2014.11); *H04N 19/91* (2014.11)

(56) References Cited

U.S. PATENT DOCUMENTS

| | | | |
|---|---|---|---|
| 9,584,761 B2* | 2/2017 | Han | H04N 7/147 |
| 9,706,200 B2* | 7/2017 | Joshi | H04N 19/85 |
| 9,756,346 B2* | 9/2017 | Gu | H04N 19/176 |
| 2008/0193028 A1 | 8/2008 | Lan | |
| 2008/0240250 A1* | 10/2008 | Lin | H04N 19/147 |
| | | | 375/240.18 |
| 2010/0104021 A1 | 4/2010 | Schmit | |
| 2010/0128796 A1* | 5/2010 | Choudhury | H04N 19/61 |
| | | | 375/240.24 |
| 2010/0166061 A1* | 7/2010 | Kondo | H04N 19/176 |
| | | | 375/240.03 |
| 2010/0226436 A1* | 9/2010 | Dane | H04N 19/139 |
| | | | 375/240.16 |
| 2010/0260268 A1* | 10/2010 | Cowan | H04N 19/597 |
| | | | 375/240.25 |
| 2010/0322306 A1* | 12/2010 | Au | H04N 19/176 |
| | | | 375/240.03 |
| 2011/0150072 A1 | 6/2011 | Han | |
| 2011/0235706 A1* | 9/2011 | Demircin | H04N 19/126 |
| | | | 375/240.03 |
| 2011/0243229 A1* | 10/2011 | Kim | H04N 19/176 |
| | | | 375/240.13 |
| 2011/0317930 A1* | 12/2011 | Kim | G06T 9/00 |
| | | | 382/233 |
| 2012/0170647 A1* | 7/2012 | He | H04N 19/48 |
| | | | 375/240.03 |
| 2012/0307906 A1* | 12/2012 | Kim | H04N 19/176 |
| | | | 375/240.16 |
| 2013/0077696 A1* | 3/2013 | Zhou | H04N 19/176 |
| | | | 375/240.24 |
| 2014/0098854 A1* | 4/2014 | Gu | H04N 19/593 |
| | | | 375/240.03 |
| 2014/0098855 A1* | 4/2014 | Gu | H04N 19/139 |
| | | | 375/240.03 |
| 2014/0226715 A1* | 8/2014 | Sato | H04N 19/0009 |
| | | | 375/240.03 |
| 2014/0362912 A1* | 12/2014 | Sjoberg | A63B 53/047 |
| | | | 375/240.03 |
| 2015/0110408 A1* | 4/2015 | Wang | G06T 9/004 |
| | | | 382/238 |
| 2015/0163505 A1* | 6/2015 | Sato | H04N 19/159 |
| | | | 375/240.12 |
| 2016/0198154 A1* | 7/2016 | Hsiang | H04N 19/70 |
| | | | 375/240.03 |
| 2016/0353117 A1* | 12/2016 | Seregin | H04N 19/174 |

* cited by examiner

METHOD OF LOSSLESS MODE SIGNALING FOR VIDEO SYSTEM WITH LOSSLESS AND LOSSY CODING

CROSS REFERENCE TO RELATED APPLICATIONS

The present invention claims priority to U.S. Provisional Patent Application, Ser. No. 61/890,360, filed on Oct. 14, 2013, entitled "Method and Apparatus for Lossy & Lossless Video Coding". The U.S. Provisional Patent Application is hereby incorporated by reference in its entirety.

FIELD OF THE INVENTION

The present invention relates to a coding system supporting both lossless coding and lossy coding for screen content coding and range extension. In particular, the present invention discloses efficient signaling associated with lossless mode.

BACKGROUND AND RELATED ART

High efficiency video coding (HEVC) is a new-generation international video coding standard developed by the Joint Collaborative Team on Video Coding (JCT-VC). The standard is based on the conventional hybrid coding approach. According to HEVC, a picture is divided into multiple non-overlapped largest coding units (LCUs), also called coding tree blocks (CTBs). The pixel values of a coding unit (CU) are predicted spatially or temporally. The resulting residual signal is transformed for further redundancy removal. The transform coefficients are then quantized and entropy coded. The reconstructed picture is recovered from the decoded residual signal and the prediction signal. After reconstruction, the reconstructed picture is further processed by in-loop filtering to reduce coding artifacts. FIG. 1A-FIG. 1B illustrate exemplary system block diagrams for a HEVC-based encoder and decoder respectively.

FIG. 1A illustrates an exemplary adaptive Inter/Intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to form a video bitstream corresponding to the compressed video data. The bitstream associated with the residues is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. In the Intra mode, a reconstructed block may be used to form Intra prediction of spatial neighboring block. Therefore, a reconstructed block from REC 128 may be provided to Intra Prediction 110. When an inter-prediction mode is used, a reference picture or pictures have to be reconstructed at the encoder end as well. Consequently, the transformed and quantized residues are processed by Inverse Quantization (IQ) 124 and Inverse Transform (IT) 126 to recover the residues. The residues are then added back to prediction data 136 at Reconstruction (REC) 128 to reconstruct video data. The reconstructed video data can be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard, deblocking (DF) processing module 130, Sample Adaptive Offset (SAO) processing module 131 have been developed to enhance picture quality. The in-loop filter information may have to be incorporated in the bitstream so that a decoder can properly recover the required information. Therefore, in-loop filter information from SAO is provided to Entropy Encoder 122 for incorporation into the bitstream. In FIG. 1A, DF 130 is applied to the reconstructed video first and SAO 131 is then applied to DF-processed video (i.e., deblocked video).

A corresponding decoder for the encoder in FIG. 1A is shown in FIG. 1B. The video bitstream is decoded by Entropy Decoder 142 to recover the transformed and quantized residues, SAO information and other system information. At the decoder side, only Motion Compensation (MC) 113 is performed instead of ME/MC. The decoding process is similar to the reconstruction loop at the encoder side. Switch 144 selects Intra-prediction 110 or motion-compensated prediction 113. SAO information and other system information are used to reconstruct the video data. The reconstructed video is further processed by DF 130 and SAO 131 to produce the final enhanced decoded video.

The current HEVC standard (i.e., version 1) only supports the picture sampling formats 4:0:0 and 4:2:0 with a pixel depth equal to 8 bits or 10 bits for each color component. However, JCT-VC is undertaking the efforts to develop the range extension to the HEVC standard for fast emerging video coding applications at a high fidelity level such as UHDTV (Ultra-High Definition TV). The extended HEVC standard is expected to be able to support YUV4:2:2, YUV4:4:4 and RGB4:4:4 picture formats.

The current HEVC coding system, as defined in the HEVC version 1, supports a lossless video coding mode so as to fully recover the coded source video. It is accomplished by skipping the coding steps that may introduce error or distortion such as the transform/inverse transform and quantization/inverse quantization as shown in the coding system of FIG. 1A-FIG. 1B. Further, in the case of lossless coding, the use of deblock filtering, sample-adaptive offset (SAO) processing and sign hiding operations may also introduce distortion to the reconstructed video. This lossless coding mode can be applied to individual coding units (CUs) as signaled by a coded syntax cu_transquant_bypass_flag for each CU. The lossless mode is enabled by a higher level syntax flag transquant_bypass_enabled_flag in the picture parameter set (PPS) to indicate whether the lossless mode (named transquant bypass mode) is allowed for the corresponding picture. When this picture level flag indicates that the transquant bypass mode (i.e., lossless mode) is enabled, an encoder may determine whether to code each CU using the lossless mode by signaling the flag, cu_transquant_bypass_flag for each CU. However, this signaling scheme cannot clearly and efficiently indicate that an entire slice or picture is coded in a lossless mode, which is the common scenario for lossless video coding applications.

BRIEF SUMMARY OF THE INVENTION

A method of efficient lossless mode syntax signaling for a coding system supporting both lossless and lossy coding is disclosed. In one embodiment, a first syntax element is incorporated in a picture level to indicate whether to use a forced lossless coding mode if lossless coding is allowed for the current picture. If the first syntax indicates that the forced lossless coding mode is selected, all coding units in the slices of the picture are coded using lossless coding. If the first syntax indicates that the forced lossless coding mode is not selected, each coding unit in a slice of the picture can be coded according to a second syntax element indicating whether each coding unit is coded using lossless coding or not. Whether lossless coding is allowed can be indicated by a third syntax element in the picture level. The first, second and third syntax elements may correspond to cu_transquant_bypass_forced_flag, cu_transquant_bypass_flag and transquant_bypass_enabled_flag respectively.

To further improve the coding efficiency, information only associated with lossy coding can be excluded in the bitstream when lossless coding is selected. Also, processing only associated with lossy coding such as deblocking filter (DF), sample adaptive offset (SAO) and context-adaptive binary arithmetic coding (CABAC) related to transform coefficient coding can be skipped when lossless coding is selected.

In another embodiment, if lossless coding is allowed for the current picture, a first syntax element in a picture level can be used to indicate whether a second syntax element is present in each slice for selecting lossy coding or lossless coding. If the first syntax indicates that the second syntax element is present, the second syntax element is used in each slice to indicate whether a forced lossless coding mode is selected. If the second syntax element indicates that the forced lossless coding mode is selected, all coding units in the slice will be coded using lossless coding. If the second syntax indicates that the forced lossless coding mode is not selected, each coding unit in each slice of the picture is coded according to a third syntax element indicating whether each coding unit is coded using lossless coding or not. The first, second, third and fourth syntax elements may correspond to cu_transquant_bypass_forced_present_flag, cu_transquant_bypass_forced_flag, cu_transquant_bypass_flag and transquant_bypass_enabled_flag respectively.

DETAILED DESCRIPTION OF THE INVENTION

Figure 1A:
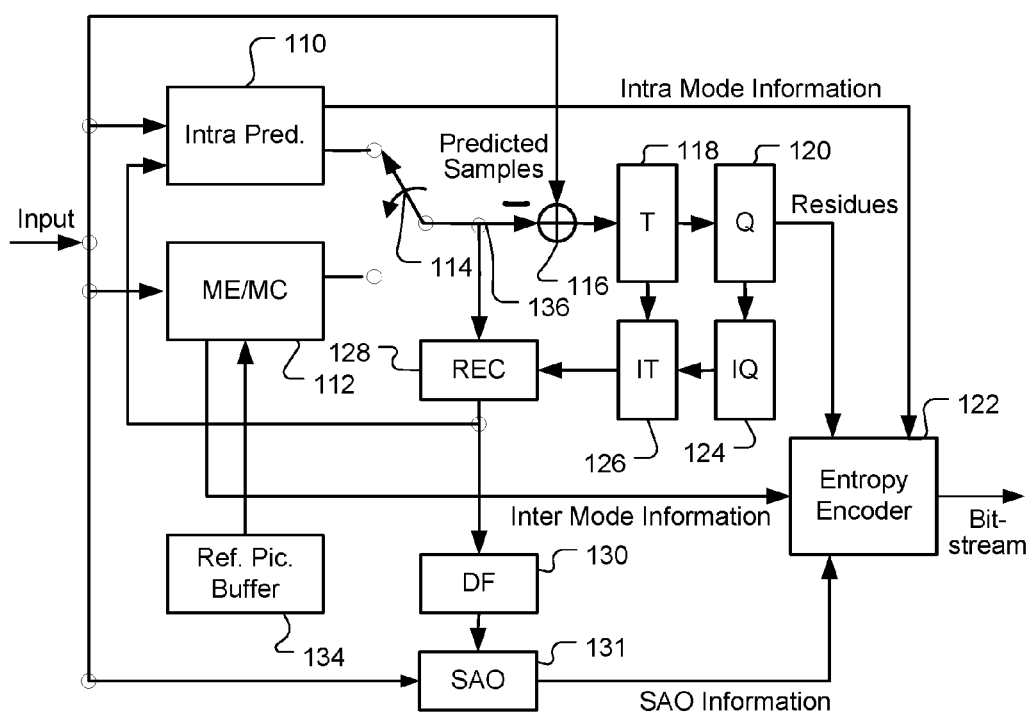
FIG. 1A illustrates an example of a video encoder according to the high efficiency video coding (HEVC) standard.
Figure 1B:
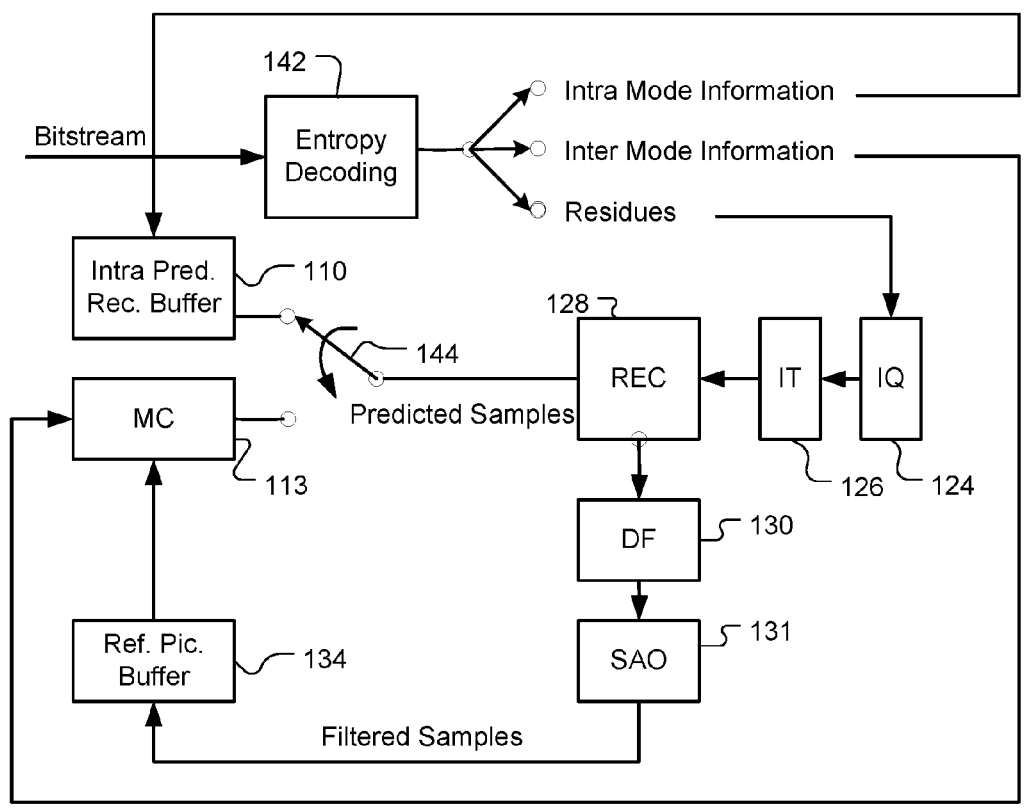
FIG. 1B illustrates an example of a video decoder according to the high efficiency video coding (HEVC) standard.

In order to develop more efficient coding for the lossless coding case, embodiments of the present invention provide the signaling schemes to indicate that a larger image area such as an entire picture or an entire slice is coded in the lossless mode. As is known to various coding standards including HEVC, a slice is an image structure that a picture can be divided to allow each slice to have own local coding configuration. As mentioned before, quantization and in-loop processing such as deblocking filter (DF) and sample adaptive offset (SAO) will not be performed in the lossless mode. Accordingly, when the new flag is signaled to indicate that the current slice is coded in a lossless mode, the information related to SAO, quantization, and deblocking filter parameters are excluded from the slice segment header and payload data. Furthermore, when the new flag is signaled to indicate that the current slice is coded in a lossless mode, there is no need to signal the syntax cu_transquant_bypass_flag for each individual CU. In this case, the syntax cu_transquant_bypass_flag is inferred to be 1 for each CU in the current slice. Furthermore, any coding tool and resource that are only utilized for lossy coding such as some CABAC (context-adaptive binary arithmetic coding) contexts dedicated to entropy coding of transform coefficients can be skipped.

First Embodiment

According to the first embodiment, a new syntax element can be added to the HEVC Picture Parameter Set (PPS) extension when the PPS syntax transquant_bypass_enabled_flag is equal to 1. For example a syntax cu_transquant_bypass_forced_flag can be used for this purpose to add to the PPS. When the syntax cu_transquant_bypass_forced_flag equals to 1, it indicates that an entire current picture is coded in a lossless mode. On the other hand, when the syntax has a value of 0, each CU is allowed to have its own flag cu_transquant_bypass_flag to indicate whether the CU is coded using the lossless mode or not. The syntax is inferred to be 0 when the syntax is not present or not coded. An example of the syntax modification to the PPS of the existing HEVC standard to support the first embodiment is shown in Table 1:

TABLE 1

|  | Descriptor | Note |
| --- | --- | --- |
| pps_scc_extensions( ) { |  |  |
| ..... |  |  |
| if (transquant_bypass_enabled_flag) |  | (1) |
| cu_transquant_bypass_forced_flag | u(1) | (2) |
| ..... |  |  |
| } |  |  |

As shown in Table 1, the new syntax cu_transquant_bypass_forced_flag is added as indicated by Note (2) when syntax transquant_bypass_enabled_flag has a value of 1 as indicated by Note (1) in Table 1. Other syntax in the PPS remains the same as the conventional HEVC standard. An example of modification to the slice header syntax of the conventional HEVC standard is shown in Table 2.

TABLE 2

| | Descriptor | Note |
|---|---|---|
| slice_segment_header( ) { | | |
|     first_slice_segment_in_pic_flag | u(1) | |
|     .... | | |
|     if( !dependent_slice_segment_flag) { | | |
|         .... | | |
|         if( sample_adaptive_offset_enabled_flag | | (3) |
|             && !cu_transquant_bypass_forced_flag) { | | |
|             slice_sao_luma_flag | u(1) | |
|             if( ChromaArrayType != 0 ) | | |
|                 slice_sao_chroma_flag | u(1) | |
|         } | | (4) |
|         .... | | |
|         if (!cu_transquant_bypass_forced_flag) { | | (5) |
|             slice_qp_delta | se(v) | |
|             if( pps_slice_chroma_qp_offsets_present_flag ) { | | |
|                 slice_cb_qp_offset | se(v) | |
|                 slice_cr_qp offset | se(v) | |
|             } | | |
|             if( deblocking_filter_override_enabled_flag ) | | |
|                 deblocking_filter_override_flag | u(1) | |
|             if( deblocking_filter_override_flag ) { | | |
|                 slice_deblocking_filter_disabled_flag | u(1) | |
|                 if( !slice_deblocking_filter_disabled_flag ) { | | |
|                     slice_beta_offset_div2 | se(v) | |
|                     slice_tc_offset_div2 | se(v) | |
|                 } | | |
|             } | | |
|             .... | | |
|         } | | (6) |
|     } | | |
|     .... | | |
|     byte_alignment( ) | | |
| } | | |

As shown in Table 2, the test "if(sample_adaptive_offset_enabled_flag)" is modified to "if(sample_adaptive_offset_enabled_flag && !cu_transquant_bypass_forced_flag)" as shown in Note (3). The added condition "!cu_transquant_bypass_forced_flag" causes that the subsequent SAO information from Note (3) to Note (4) will not be included if all CUs in the slice are coded in the lossless mode as indicated by syntax cu_transquant_bypass_forced_flag having a value of 1. Furthermore, the test "if (!cu_transquant_bypass_forced_flag)" is added as indicated by Note (5). If the condition is satisfied (i.e., CUs in the slice not coded in the lossless mode), the slice level quantization parameter (QP) information and deblocking filter information between Note (5) and Note (6) will not be included.

An example of modification to the coding unit (CU) level syntax of the conventional HEVC standard is shown in Table 3.

TABLE 3

| | Descriptor | Note |
|---|---|---|
| coding_unit( x0, y0, log2CbSize ) { | | |
|     if( transquant_bypass_enabled_flag | | (7) |
|         && !cu_transquant_bypass_forced_flag ) | | |
|         cu_transquant_bypass_flag | ae(v) | |
|     .... | | |

As shown in Table 3, the test "if(transquant_bypass_enabled_flag)" is modified to "if(transquant_bypass_enabled_flag && !cu_transquant_bypass_forced_flag)". In the modified case, the CU level lossless coding flag (i.e., cu_transquant_bypass_flag) will only be included when the picture level syntax transquant_bypass_enabled_flag is 1 (i.e., lossless mode is enabled at the picture level) and the slice level syntax cu_transquant_bypass_forced_flag is 0 (i.e., non-forced CUs in the slice).

The syntax tables as shown in Table 1 to Table 3 are intended to illustrate exemplary modifications to the existing HEVC syntax table to support the efficient lossless-mode syntax signaling. The new syntax element cu_transquant_bypass_forced_flag is introduced to spare the need for incorporating lossless flag in individual CUs when it is desired to code an entire picture in the lossless mode. While the new syntax element is incorporated in the picture level as shown in the example, the new syntax element may also be incorporated in a higher level above picture. If it is desirable, the new syntax element may also be incorporated in a sequence level. Furthermore, while a specific name cu_transquant_bypass_forced_flag is used for the new syntax element, it is understood that other names may also be used to serve the purpose. Accordingly, the specific syntax name should not be construed as limitation to this invention.

Second Embodiment

According to the second embodiment, a first new syntax element can be added to the HEVC PPS extension to indicate whether a second new syntax for forcing lossless mode will be present in the slice header when the PPS syntax transquant_bypass_enabled_flag is equal to 1. For example, cu_transquant_bypass_forced_present_flag can be used as the first new syntax element. When the syntax cu_transquant_bypass_forced_present_flag equals to 1, it indicates that the second new syntax element will be present in the slice header. Otherwise, the second new syntax element will not be present in the slice header. The second new syntax element can be cu_transquant_bypass_forced_flag. When the second new syntax element equals to 1, it indicates that an entire slice is coded in a lossless mode. When the second new syntax element has a value of 0, the lossless coding mode can be applied to individual coding units (CUs) as signaled by the syntax cu_transquant_bypass_flag for each CU. The second new syntax element is inferred to be 0 when it is not coded. Both the first and second new syntax elements (i.e., cu_transquant_bypass_forced_present_flag and cu_transquant_bypass_forced_flag) are inferred to be 0 when they are not present. In the first embodiment, when the forced lossless mode is used, all CUs in a picture will be coded in the lossless mode if the flag indicates that the forced lossless mode is used. The second embodiment allows the forced lossless mode control at the slice level. Since the cu_transquant_bypass_forced_flag is incorporated at each slice header, each slice may have a forced lossless mode flag to force all CUs within the corresponding slice to be coded using the lossless coding. An exemplary syntax modification to the HEVC standard is shown in Table 4 to Table 6 below.

TABLE 4

| | Descriptor | Note |
|---|---|---|
| pps_scc_extensions( ) { | | |
| ..... | | |
|    if (transquant_bypass_enabled_flag) | | (8) |
|       cu_transquant_bypass_forced_present_flag | u(1) | (9) |
| ..... | | |
| } | | |

As shown in Table 4, the new syntax cu_transquant_bypass_forced_present_flag is added as indicated by Note (9) when syntax transquant_bypass_enabled_flag has a value of 1 as indicated by Note (8) in Table 4. Other syntax in the PPS remains the same as the conventional HEVC standard. An example of modification to the slice header syntax of the conventional HEVC standard is shown in Table 5.

TABLE 5

| | Descriptor | Note |
|---|---|---|
| slice_segment_header( ) { | | |
|   first_slice_segment_in_pic_flag | u(1) | |
|   .... | | |
|   if( !dependent_slice_segment_flag ) { | | |
|     .... | | |
|     if(cu_transquant_bypass_forced_present_flag) | | (10) |
|       cu_transquant_bypass_forced_flag | u(1) | (11) |
|     if(sample_adaptive_offset_enabled_flag | | (12) |
|       && !cu_transquant_bypass_forced_flag) { | | |
|       slice_sao_luma_flag | u(1) | |
|       if( ChromaArrayType != 0 ) | | |
|         slice_sao_chroma_flag | u(1) | |
|     } | | (13) |
|     .... | | |
|     if (!cu_transquant_bypass_forced_flag) { | | (14) |
|       slice_qp_delta | se(v) | |
|       if( pps_slice_chroma_qp_offsets_present_flag ) { | | |
|         slice_cb_qp_offset | se(v) | |
|         slice_cr_qp_offset | se(v) | |
|       } | | |
|       if( deblocking_filter_override_enabled_flag ) | | |
|         deblocking_filter_override_flag | u(1) | |
|       if( deblocking_filter_override_flag ) { | | |
|         slice_deblocking_filter_disabled_flag | u(1) | |
|         if( !slice_deblocking_filter_disabled_flag ) { | | |
|           slice_beta_offset_div2 | se(v) | |
|           slice_tc_offset_div2 | se(v) | |
|         } | | |
|       } | | |
|     .... | | |
|     } | | (15) |
|   } | | |
|   .... | | |
| } | | |

As shown in Table 5, the flag cu_transquant_bypass_forced_present_flag is checked as shown in Note (10) to determine whether a flag for forcing all CUs in a slice to be lossless coded will be present. If the flag cu_transquant_bypass_forced_present_flag has a value of 1, the syntax for forcing all CUs in a slice (i.e., cu_transquant_bypass_forced_flag) will be included as shown in Note (11). The test "if(sample_adaptive_offset_enabled_flag)" in the existing HEVC syntax table is modified to "if(sample_adaptive_offset_enabled_flag && !cu_transquant_bypass_forced_flag)" as shown in Note (12). The added condition "!cu_transquant_bypass_forced_flag" causes that the subsequent SAO information from Note (12) to Note (13) will not be included if all CUs in the slice are coded in the lossless mode as indicated by syntax cu_transquant_bypass_forced_flag having a value of 1. Furthermore, the test "if (!cu_transquant_bypass_forced_flag)" is added as indicated by Note (14). If the condition is satisfied (i.e., CUs in the slice not coded in the lossless mode), the slice level quantization parameter (QP) information and deblocking filter information between Note (14) and Note (15) will not be included. An example of modification to the coding unit (CU) level syntax of the conventional HEVC standard is shown in Table 6, which is the same as Table 3 for the first embodiment.

TABLE 6

| | Descriptor | Note |
|---|---|---|
| coding_unit( x0, y0, log2CbSize ) { | | |
|   if( transquant_bypass_enabled_flag | | (7) |
|     && !cu_transquant_bypass_forced_flag ) | | |
|     cu_transquant_bypass_flag | ae(v) | |
|   .... | | |

For both embodiments, when syntax cu_transquant_bypass_flag is not coded, its value is inferred to be 1 if both transquant_bypass_enabled_flag and cu_transquant_bypass_forced_flag are equal to 1. Otherwise, syntax cu_transquant_bypass_flag is inferred to be 0.

In HEVC, the residual of a coding unit (CU) is subject to transform processing, where each CU is divided into one or more transform units (TUs). The TU level syntax also contains quantization information. When lossless coding mode is selected, there is no need to include the quantization parameter (QP) information in the TU level. Accordingly, a TU level syntax modification according to an embodiment of the present invention can be applied to the two embodiments of the present invention as shown in Table 7.

TABLE 7

| | Descriptor | Note |
|---|---|---|
| transform_unit( x0, y0, xBase, yBase, log2TrafoSize, trafoDepth, blkIdx ) | | |
| { | | |
|   log2TrafoSizeC = log2TrafoSize - ( ChromaArrayType == 3 ? 0 : 1 ) | | |
|   if( cbf_luma[ x0 ] [ y0 ] [ trafoDepth ] \|\| | | |
|     cbf_cb[ x0 ][ y0 ][ trafoDepth ] \|\| | | |
|     cbf_cr[ x0 ][ y0 ][ trafoDepth ] \|\| | | |
|     ( ChromaArrayType == 2 && | | |
|       ( cbf_cb[ x0 ][ y0 + ( 1 << log2TrafoSizeC )][ trafoDepth ] \|\| | | |
|       cbf_cr[ x0 ][ y0 + ( 1 << log2TrafoSizeC ) ][ trafoDepth ] ) ) ) { | | |
|     if( cu_qp_delta_enabled_flag && !IsCuQpDeltaCoded | | (16) |
|       && !cu_transquant_bypass_forced_flag) { | | |
|       cu_qp_delta_abs | ae(v) | |
|       if( cu_qp_delta_abs ) | | |
|         cu_qp_delta_sign_flag | ae(v) | |
|     } | | (17) |
|     .... | | |
|   } | | |
| } | | |

As shown in Table 7, an additional condition "!cu_transquant_bypass_forced_flag" is included in the test as indicated in Note (16). If cu_transquant_bypass_forced_flag has a value of 1 (i.e., CUs in the slice coded with lossless mode), the quantization parameter (QP) information in the TU level (as indicated between Note (16) and Note (17)) will not be included.

The syntax design according to the present invention provides several advantages over the existing HEVC syntax design. By using the flag cu_transquant_bypass_forced_flag, a system may use a single syntax in each picture level or slice level header to control whether all CUs in the picture or slice are coded in lossless mode or lossy mode. Otherwise, an individual syntax would have to be included in each CU to indicate the lossless mode or lossy mode for the CU. Furthermore, the syntax design according to the present invention also removes the irrelevant information associated with lossy coding such as SAO parameters and QP when lossless coding is selected. Any coding tool and resource that are only utilized for lossy coding such as some CABAC (context-adaptive binary arithmetic coding) contexts dedicated to entropy coding of transform coefficients can also be skipped. Furthermore, the system can be configured to consume less processing and storage resources associated deblocking filter and SAO processing.

The performance of a system incorporating the Second Embodiment of the present invention is compared to that of a conventional system. Table 8 illustrates the performance comparison conducted under the common test condition specified for Screen Content Coding. The comparisons are performed based on various test materials as listed in column 1. The improvement in bitrate according to the Second Embodiment of the present invention over the conventional approach is shown for Random Access (Table 8) and Low-Delay B Frame (Table 9) system configurations. As shown in Table 9, the system according to the Second Embodiment achieves up to 0.6% improvement in bitrate.

TABLE 8

|  | Random Access | | | |
|---|---|---|---|---|
|  | Total | Avg | Min | Max |
| RGB, text & graphics with motion, 1080p | 0.0% | 0.1% | 0.0% | 0.3% |
| RGB, text & graphics with motion, 720p | 0.0% | 0.1% | 0.0% | 0.2% |
| RGB, mixed content, 1440p | 0.0% | 0.0% | 0.0% | 0.0% |
| RGB, mixed content, 1080p | 0.0% | 0.0% | 0.0% | 0.0% |
| RGB, Animation, 720p | 0.0% | 0.0% | 0.0% | 0.0% |
| RGB, camera captured, 1080p | 0.0% | 0.0% | 0.0% | 0.0% |
| YUV, text & graphics with motion, 1080p | 0.0% | 0.1% | 0.0% | 0.3% |
| YUV, text & graphics with motion, 720p | 0.0% | 0.1% | 0.0% | 0.2% |
| YUV, mixed content, 1440p | 0.0% | 0.0% | 0.0% | 0.0% |
| YUV, mixed content, 1080p | 0.0% | 0.0% | 0.0% | 0.0% |
| YUV, Animation, 720p | 0.0% | 0.0% | 0.0% | 0.0% |
| YUV, camera captured, 1080p | 0.0% | 0.0% | 0.0% | 0.0% |

TABLE 9

|  | Low Delay B | | | |
|---|---|---|---|---|
|  | Total | Avg | Min | Max |
| RGB, text & graphics with motion, 1080p | 0.1% | 0.2% | 0.0% | 0.6% |
| RGB, text & graphics with motion, 720p | 0.0% | 0.1% | 0.0% | 0.3% |
| RGB, mixed content, 1440p | 0.0% | 0.0% | 0.0% | 0.0% |
| RGB, mixed content, 1080p | 0.0% | 0.0% | 0.0% | 0.0% |
| RGB, Animation, 720p | 0.0% | 0.0% | 0.0% | 0.0% |
| RGB, camera captured, 1080p | 0.0% | 0.0% | 0.0% | 0.0% |
| YUV, text & graphics with motion, 1080p | 0.1% | 0.2% | 0.0% | 0.5% |
| YUV, text & graphics with motion, 720p | 0.0% | 0.1% | 0.0% | 0.4% |
| YUV, mixed content, 1440p | 0.0% | 0.0% | 0.0% | 0.0% |
| YUV, mixed content, 1080p | 0.0% | 0.0% | 0.0% | 0.0% |
| YUV, Animation, 720p | 0.0% | 0.0% | 0.0% | 0.0% |
| YUV, camera captured, 1080p | 0.0% | 0.0% | 0.0% | 0.0% |

Figure 2:
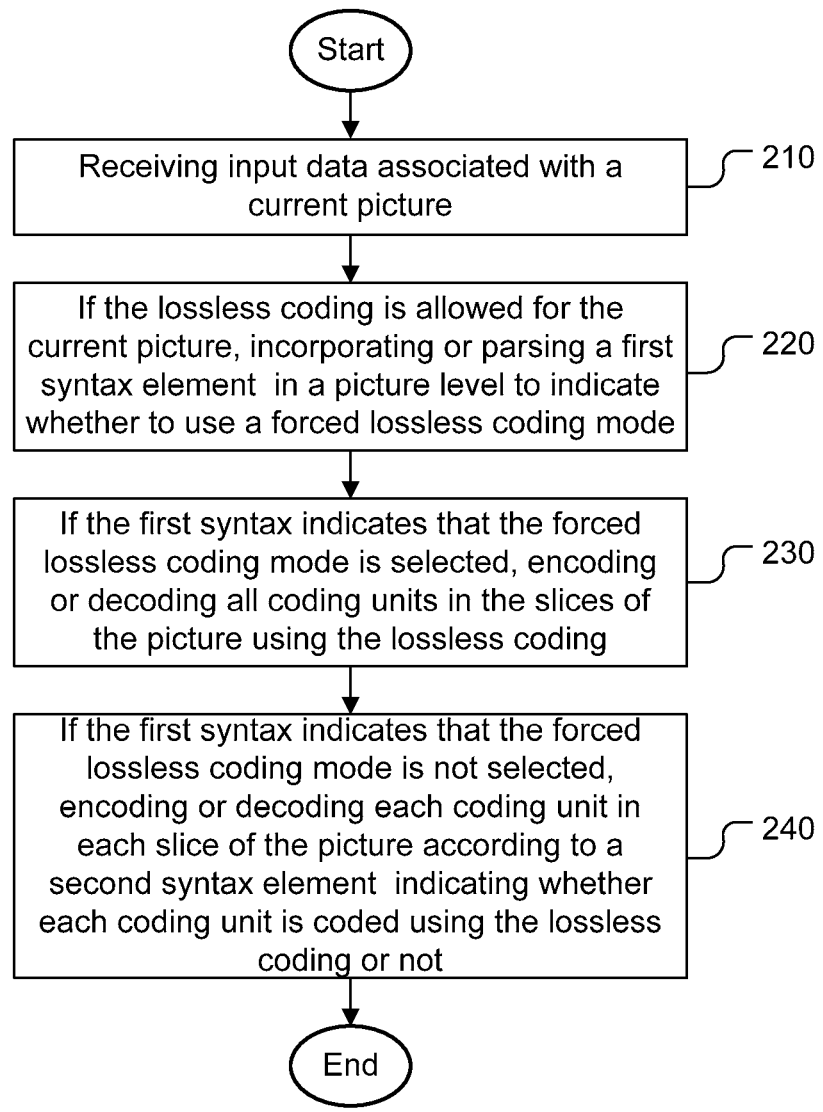
FIG. 2 illustrates a flowchart of an exemplary system incorporating an embodiment of the present invention for efficient lossless mode signaling.

FIG. 2 illustrates a flowchart of an exemplary system incorporating the first embodiment of the present invention. The system receives input data associated with a current block as shown in step 210. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. If lossless coding is allowed for the current picture, a first syntax element is incorporated in a picture level of the bitstream at an encoder side or is parsed from the bitstream at a decoder side to indicate whether to use a forced lossless coding mode as shown in step 220. If the first syntax indicates that the forced lossless coding mode is selected, all coding units in the slices of the picture are encoded or decoded using lossless coding as shown in step 230. If the first syntax indicates that the forced lossless coding mode is not selected, each coding unit in each slice of the picture is encoded or decoded according to a second syntax element indicating whether each coding unit is coded using lossless coding or not as shown in step 240.

Figure 3:
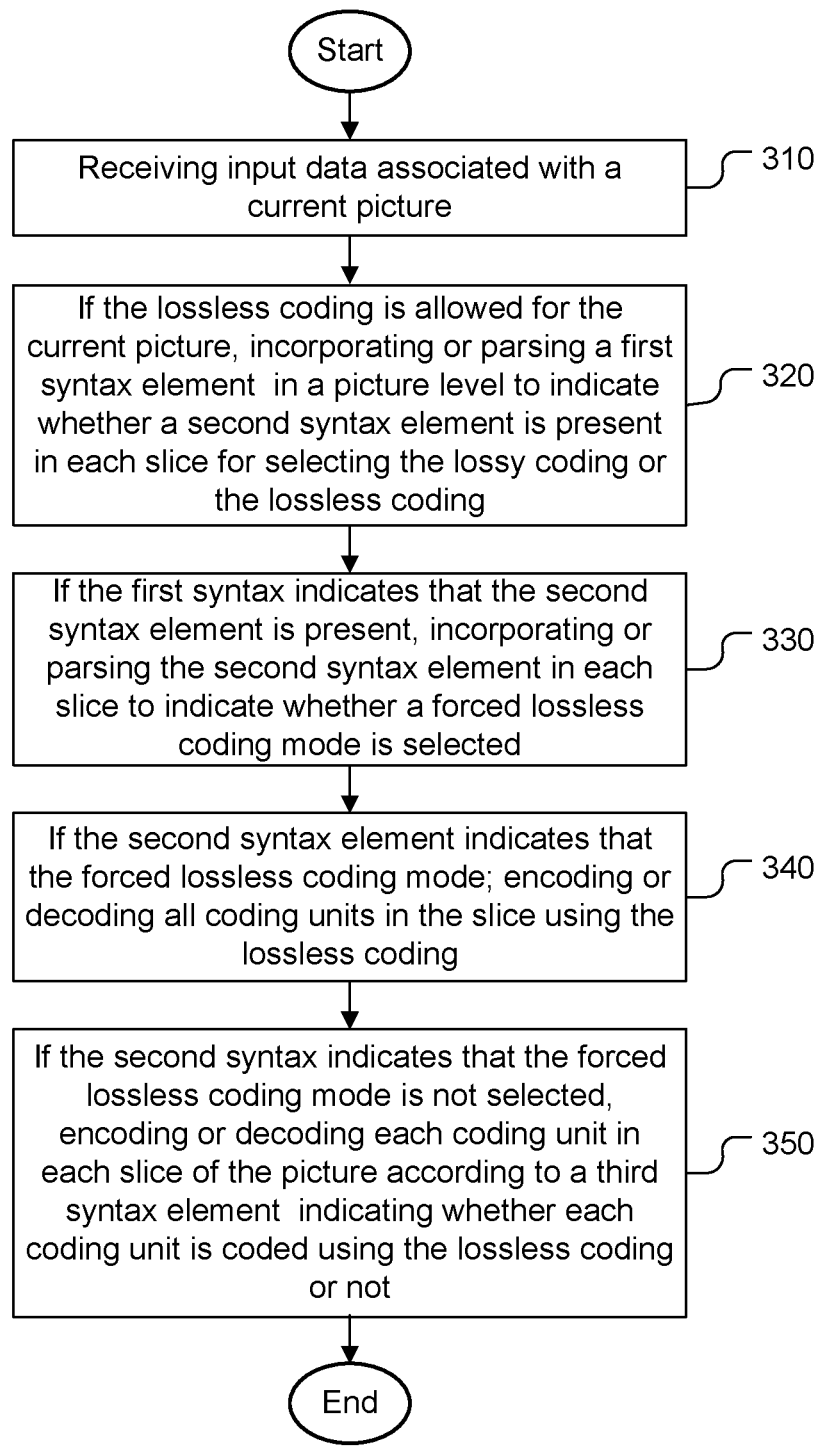
FIG. 3 illustrates a flowchart of another exemplary system incorporating an embodiment of the present invention for efficient lossless mode signaling.

FIG. 3 illustrates a flowchart of an exemplary system incorporating the second embodiment of the present invention. The system receives input data associated with a current block as shown in step 310. If lossless coding is allowed for the current picture, a first syntax element is incorporated in a picture level of the bitstream at an encoder side or is parsed from the bitstream at a decoder side to indicate whether a second syntax element is present in each slice for selecting lossy coding or lossless coding as shown in step 320. If the first syntax indicates that the second syntax element is present, the second syntax element is incorporated in each slice level of the bitstream at an encoder side or is parsed from the bitstream at a decoder side in each slice to indicate whether a forced lossless coding mode is selected as shown in step 330. If the second syntax element indicates that the forced lossless coding mode is selected, all coding units in the slice are encoded or decoded using the lossless coding as shown in step 340. If the second syntax indicates that the forced lossless coding mode is not selected, each coding unit in each slice of the picture is encoded or decoded according to a third syntax element indicating whether each coding unit is coded using lossless coding or not as shown in step 350.

The flowcharts shown above are intended to illustrate examples of efficient lossless mode signaling according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of lossless mode signaling for a coding system supporting both lossy coding and lossless coding, wherein a picture is divided into multiple slices and each slice is divided into multiple coding units, the method comprising:
    receiving input data associated with a current picture;
    if the lossless coding is allowed for the current picture, incorporating or parsing a first syntax element in a picture level to indicate whether a second syntax element is present in each slice for selecting lossy coding or lossless coding;
    if the first syntax indicates that the second syntax element is present, incorporating or parsing the second syntax element in each slice of the current picture to indicate whether a forced lossless coding mode is selected,
    if the second syntax element indicates that the forced lossless coding mode is selected, encoding or decoding all coding units in the slice using lossless coding; and
    if the second syntax indicates that the forced lossless coding mode is not selected, encoding or decoding each coding unit in the slice according to a third syntax element indicating whether each coding unit is coded using lossless coding or not.

2. The method of claim 1 further comprising:
    if the second syntax indicates that the forced lossless coding mode is selected, skipping CABAC (context-adaptive binary arithmetic coding) context formation for entropy coding of transform coefficients of all coding units in the slice.

3. The method of claim 1 further comprising:
    if the second syntax indicates that the forced lossless coding mode is selected, skipping information in a bitstream for the slice associated with sample adaptive offset processing, quantization processing and deblocking processing for all coding units in the slice using lossless coding.

4. The method of claim 1, wherein the first syntax element corresponds to cu_transquant_bypass_forced_present_flag.

5. The method of claim 1, wherein the second syntax element corresponds to cu_transquant_bypass_forced_flag.

6. The method of claim 1, wherein the third syntax element corresponds to cu_transquant_bypass_flag.

7. The method of claim 1, wherein lossless coding is allowed is indicated by a fourth syntax element in the picture level.

8. The method of claim 7, wherein the fourth syntax element corresponds to transquant_bypass_enabled_flag.

* * * * *